United States Patent [19]

Wong

[11] Patent Number: 4,810,768
[45] Date of Patent: Mar. 7, 1989

[54] METHOD AND FORMULATION FOR EXTENDING SHELF LIFE OF A SILICONE RESIN

[75] Inventor: Ching P. Wong, Lawrence Township, Mercer County, N.J.

[73] Assignee: American Telephone and Telegraph Company, New York, N.Y.

[21] Appl. No.: 97,353

[22] Filed: Sep. 8, 1987

Related U.S. Application Data

[60] Continuation-in-part of Ser. No. 940,463, Feb. 5, 1987, abandoned, which is a continuation of Ser. No. 831,764, Feb. 21, 1986, abandoned, which is a division of Ser. No. 673,011, Nov. 19, 1984, Pat. No. 4,592,959.

[51] Int. Cl.$^4$ .............................................. C08G 77/06
[52] U.S. Cl. ................................... 528/21; 528/12; 528/15; 528/22; 528/31; 528/32; 528/901
[58] Field of Search ................ 528/21, 22, 901, 12, 528/15, 31, 32

[56] References Cited

U.S. PATENT DOCUMENTS

| | | |
|---|---|---|
| 3,674,738 | 7/1972 | Nitzsche et al. . |
| 3,678,003 | 7/1972 | Kaiser et al. . |
| 3,686,357 | 8/1972 | Cheeseman . |
| 3,702,769 | 11/1972 | Vaughn . |
| 3,923,736 | 12/1975 | Nitzsche et al. . |
| 4,036,813 | 7/1977 | Hardman et al. . |
| 4,248,993 | 2/1981 | Takago . |
| 4,431,472 | 2/1984 | Hohl et al. . |
| 4,515,932 | 5/1985 | Chung .................................. 528/21 |
| 4,528,324 | 7/1985 | Chung et al. ........................ 528/21 |

OTHER PUBLICATIONS

Noller, Chemistry of Organic Compounds, W. B. Saunders Co., Philadelphia, 1965, p. 252.

*Primary Examiner*—Melvyn I. Marquis
*Attorney, Agent, or Firm*—Roderick B. Anderson

[57] ABSTRACT

A method of extending the shelf-life of an uncured silicone resin formulation which includes a primary amine therein comprises adding an acid to the formulation in a molar quantity approximately equal to the number of moles of primary amine present in the formulation, said acid being volatile at or below the curing temperature of the resin formulation.

20 Claims, 1 Drawing Sheet

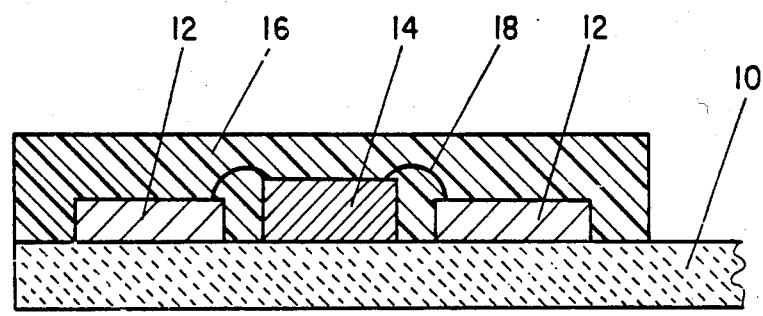

METHOD AND FORMULATION FOR EXTENDING SHELF LIFE OF A SILICONE RESIN

This application is a continuation-in-part of application Ser. No. 940,463, filed Feb. 5, 1987, now abandoned, which is a continuation of application Ser. No. 831,764, filed on Feb. 21, 1986, now abandoned, which is a divisional application of Ser. No. 673,011 filed on Nov. 19, 1984, now U.S. Pat. No. 4,592,959.

TECHNICAL FIELD

This invention relates to electronic devices which are encapsulated by means of a polymeric encapsulate and more particularly, to such devices which are encapsulated by means of a silicone resin.

BACKGROUND OF THE INVENTION

Silicone resins have been used in various industrial applications because of their thermal stability, dielectric properties, mechanical properties, chemical resistance and resistance to atmospheric deterioration. One such use is as an encapsulate for electronic devices, e.g., integrated circuit devices and hybrid integrated circuits. However, it has been found that in certain applications, e.g., where adhesion is required to a gold or tantalum surface and device processing subsequent to encapsulation includes a cleaning step in solvents such as Freon ®, the silicone encapsulate tends not to adhere well to the metal surface and further, often exhibits swelling and bleeding. At the present time there are no commercially available screen printable silicone resins which exhibit the desired adhesion to gold and tantalum surfaces especially when processing includes exposure of the encapsulated devices to certain Freon solvents. In my U.S. Pat. No. 4,564,562, issued Jan. 14, 1986, I have disclosed a modifier for silicone resins which eliminates the aforementioned problems and allows selective encapsulation over gold or tantalum surfaces by screen printing methods as well as other coating processes. While the formulation as set forth in my copending application achieves the desired result, the formulation exhibits a relatively short pot life making it difficult to use in a commercial manufacturing environment. I have now discovered a means for improving the pot life of that formulation from several hours to several months without affecting any of the other properties of the encapsulant. Further, it is believed that the solution for extending the pot life of the encapsulant described in my U.S. Pat. No. 4,564,562, issued Jan. 14, 1986, is also useful for extending the pot life of any silicone resin containing an active amine as one of the constituents in the formulation.

SUMMARY OF THE INVENTION

A stabilized heat curable silicone resin formulation comprises a primary amine therein together with an acid which is volatile at or below the curing temperature of the resin, said acid being present in a molar equivalent weight equal to the number of moles of primary amine present in the formulation.

The invention also includes the method of making such formulation.

BRIEF DESCRIPTION OF THE DRAWING

The FIGURE is an elevational cross-sectional view of a typical integrated circuit device encapsulated with a silicone encapsulant.

DETAILED DESCRIPTION

The need for improved silicone resins for encapsulating electronic devices is well-known especially as related to devices having gold terminal pads which undergo post-encapsulant cleaning in solvents such as Freon TMC ®. The problem of adhesion of silicone encapsulants to gold is one that has been recognized in the industry and has limited the use of silicones in certain manufacturing processes. This problem has been solved by modifying a silicone encapsulant formulation by the addition of a dialkylaminoalkoxysilane to the formulation. This modification is fully described in my U.S. Pat. No. 4,564,562, issued Jan. 14, 1986, which is incorporated herein by reference. The improvement in adhesion is achieved by adding a compound having functional groups which act as a cross-linking agent, a catalyst and a promoter, to an oxime-free and water-free, heat curable, silicone elastomer prepolymer and then heat curing the mixture subsequent to coating the device to be encapsulated by the silicone resin. Suitable compounds for use in the formulation so as to give the improved adhesion are the dialkylaminotrialkoxysilanes and dialkylaminodialkoxysilanes, particularly those wherein the alkyl and alkoxy groups have from one to four carbon atoms, the amine groups include a secondary and a primary amine nitrogen separated by an alkyl group and wherein an alkyl group separates the secondary amine nitrogen from the silicon atom. A preferred additive is N-2-aminoethyl-3-aminopropyltrimethoxy silane ($NH_2CH_2CH_2NH\ CH_2CH_2CH_2Si(OCH_3)_3$). Such additives are effective in preventing delamination, blistering and swelling even when present in small quantities, e.g., 0.5 to 3 weight percent of the silicone formulations. Generally, one weight percent is sufficient when using the preferred compound indicated above.

While use of these amine containing additives solve the adhesion problem, it has recently been determined that the pot life (the time it takes for the resin formulation to cure, while standing at room temperature, to a degree which prevents its use for its intended purpose) is only several hours. This presents a significant problem for the commercial use in a manufacturing facility of such formulation. It has now been discovered that by adding a small amount of an acid of a type which will volatilize at the curing temperature and will not leave any significant detrimental residues, the pot life problem can be substantially eliminated. The acids are preferably added to the silicone formulation in a quantity equivalent to the number of moles of primary amine contained in the silicone formulation.

In general, the novel formulations which exhibit the superior adhesion to gold and tantalum metal surfaces, even under severe solvent cleaning conditions employed in the electronics industry, are free of oximes and are heat curable as opposed to room temperature moisture curable silicones and a also free of water. Room temperature RTV silicaone resins are those silicone resins which polymerize by a moisture initiated, catalyst assisted process. The curing process for RTV type silicone resins requires moisture from the air as well as a catalyst, e.g., a titanate, to accelerate the cure. The use of heat in RTV systems primarily acts to accelerate the evaporation of solvents e.g., xylene, present in the RTV system. The reaction mechanism is that of a condensation reaction wherein an alkoxy, oxime or amine terminated siloxane reacts with moisture to give a hydroxyl terminated siloxane. This hydroxyl group then further reacts with other alkoxy, oxime or amine groups to result in chain extension and/or crosslinking. Heat curable silicone resins, as the term is used herein, refers to silicone resin formulations which cure by a process involving an additional type reaction mechanism attained by heating at a temperature significantly above room temperature (25° C.) a mixture of a reactant having Si-vinyl groups with one having Si-H groups in the presence of a small amount (5-10 ppm) of a platinum catalyst to accelerate the cure. The temperature is raised in these systems to above room temperature, generally 50° C.-200° C., to initiate crosslinking. When the Si-vinyl reactant is separated from the Si-H containing reactant, the Pt is incorporated with the Si-vinyl material. When the two components are mixed, this mixture generally may be stored at low temperatures, i.e., well below room temperature, with a shelf-life of several weeks. These formulations consist essentially of a heat curable silicone elastomer prepolymer in an amount of from 20 to 25 weight percent and having an average molecular weight of from 400,000 to 600,000; 0.5 to 2.0 weight percent of a dialkylaminodialkoxysilane wherein one amine group is a secondary amine and the other is a primary amine and the amine nitrogen is not directly coupled to the silicon atom; 0 to 80 weight percent filler; 0 to 2 weight percent curing catalyst and 0 to 0.2 weight percent stabilizer. To the above formulation, one may add a solvent to adjust for viscosity. In addition, the improvement includes an acid which volatilizes at or below the curing temperature of the elastomer in an amount equal to the number of moles of the dialkylaminoalkoxysilane. Preferably, the acid is one which will not leave unwanted contaminates in the cured silicone resin. The preferred acids are low molecular weight organic acids such as formic, acetic and propionic acids. The organic acid should be soluble in the resin formulation. In order to increase solubility of the acid in the formulation, the organic acid may be dissolved in a solvent. Particularly suitable solvents are ethers such as bis(2-methoxyethyl ether), diethyleneglycoldimethylether and propyleneglycolmethylether.

It is believed that the action of the acid in the formulation is to temporarily tie up the active primary nitrogen group on the dialkyl amine additive. This prevents these reactive amines from initiating polymerization and limiting pot life. Upon heating of the heat curable silicone resin, the volatile acid is detached from the amine and substantially evaporates from the formulation. Consequently, at room temperature, it inhibits curing but does not impede curing at the desired curing temperature. While the quantity of acid is not critical, amounts less than that equivalent to the molar quantity of the dialkylaminoalkoxysilane would not result in tying up all of the primary amine groups, as desired. Hence, it is preferred that the amount of acid added be equivalent to, or slightly greater than, the molar quantity of the dialkylaminoalkoxysilane.

Suitable heat curable silicone elastomers are known in the art and are commercially available. The alkyl groups of the suitable silanes are preferably from one to four carbon atoms and the alkoxy groups are preferably methoxy but can be ethoxy or propoxy. Also, the silane can be a trialkoxy or a dialkoxy silane. When it is a dialkoxy silane, the remaining radical bonded to the silicon atom may be hydrogen or an alkyl group of from one to three carbon atoms. The preferred materials are hereinafter set forth. The fillers are generally employed to control viscosity and should be limited in an amount to allow for good dispersion and desired viscosity control. High filler levels have also been found to prevent swelling of the cured silicone upon exposure to solvent. The filler should be inert and of generally fine particle size. Typical fillers are silica and alumina.

While the dialkylaminoalkoxysilane acts to catalyze curing, an additional curing catalyst, e.g., a tri-aminoalkylalkoxysilane may be added as well. Also, stabilizers such as metal complexes and phosphites as are known in the art may be employed.

EXAMPLE I

A screen printable, heat curable silicone resin formulation was prepared in accordance with the following formulation wherein DC-649 is a hydroxy functional phenyl-methyl siloxane made by Dow Corning, Midland, Mich. and BASF-5882 is an organic type pigment.

| Ingredient | Weight Percent |
| --- | --- |
| DC-649 | 23.9 |
| protonated amine catalyst | 1 |
| N—2-aminoethyl-3-aminopropyl-trimethoxysilane | 1 |
| silica filler | 74 |
| pigment | 0.1 |
| terpinol solvent | — |

The solvent is not included in calculating the weight percent of the components and is employed to the extent necessary to achieve the desired viscosity for the screen printing or other coating technique to be employed The viscosity can also be adjusted by chan9ing the amount of filler.

The viscosity of the above formulation chan9es slowly and after approximately four hours, becomes unsuitable for use in screen printing.

EXAMPLE II

The formulation of Example I was modified by adding 2 cc of proplyene glycol methyl ether per 100 cc of the above formulation having dissolved therein a molar quantity of acetic acid equal to the number of moles of the N-2-aminoethyl-3-aminopropyltrimethyloxysilane in the formulation. This formulation reached the same degree of cure in the same time as the formulation of Example I, however, the pot life at room temperature of this formulation was extended from four hours to four months. That is, the viscosity of the prepared formulation remained at a level suitable for use in screen printing for a period of about four months.

Referring to the figure there is shown an example of a hybrid integrated circuit 10 having a gold plated electrode pattern 12 thereon for ease of bonding to integrated circuit chips 14 on the device 10. The entire device, in this instance is coated with the novel silicone formulation 16. The circuit chips 14 are bonded to the electrode pattern by means of wire bonds 18. Alternatively, of course, one can coat discrete components or portions of the device by well known screen printing techniques.

What is claimed is:

1. A method of extending the shelf-life of an uncured heat curable silicone resin formulation which comprises a mixture of a reactant having Si-vinyl groups, with one having Si-H groups and a platinum catalyst, and a primary amine therein comprising adding an acid to the formulation in a molar quantity approximately equal to the number of moles of primary amine present in the formulation, said acid being volatile at or below the curing temperature of the resin formulation.

2. The method recited in claim 1, wherein the acid is an organic acid.

3. The method recited in claim 2, wherein the acid is selected from the group consisting of formic, acetic and propionic acids.

4. The method recited in claim 1, wherein the acid is acetic acid.

5. The method recited in claim 1 wherein the primary amine in the formulation is a dialkylaminoalkoxysilane.

6. The method recited in claim 1, wherein the primary amine is N-2-aminoethyl-3-aminopropyltrimethoxy silane.

7. The method recited in claim 5, wherein the acid is an acid selected from the group consisting of formic, acetic and propionic acid.

8. The method recited in claim 6, wherein the acid is an acid selected from the group consisting of formic, acetic and propionic acid.

9. The method recited in claim 6, wherein the acid is acetic acid.

10. The method recited in claim 1, including adding filler to the formulation.

11. An uncured, heat curable silicone resin formulation which comprises a silicone comprising a mixture of a reactant having Si-vinyl groups with one having Si-H groups and a platinum catalyst, and a primary amine-containing additive and an acid which is volatile at the curing temperature, said acid being present in a molar amount approximately equal to or slightly greater than the molar quantity of primary amine in the formulation.

12. The silicone resin formulation recited in claim 11, wherein the acid is an organic acid.

13. The silicone resin formulation recited in claim 12, wherein the acid is selected from the group consisting of formic, acetic and propionic acids.

14. The silicone resin formulation recited in claim 11, wherein the acid is acetic acid.

15. The silicone resin formulation recited in claim 11, wherein the primary amine in the formulation is a dialkylaminoalkoxysilane.

16. The silicone resin formulation recited claim 11, wherein the primary amine is N-2-aminoethyl-3-aminopropyl-trimethoxy silane 17. The silicone resin formation recited in claim 15, wherein the acid is an acid selected from group consisting of formic, acetic and propionic acid 18. The silicone resin formulation recited in claim 16, wherein the acid is an acid selected from group consisting of formic, acetic and propionic acid.

19. The silicone resin formulation recited in claim 16, wherein the acid is acetic acid.

20. The silicone resin formulation recited in claim 11, further comprising filler included in the formulation.

* * * * *